United States Patent
Yang et al.

(10) Patent No.: US 9,374,738 B2
(45) Date of Patent: Jun. 21, 2016

(54) ENHANCED INTER-RADIO ACCESS TECHNOLOGY (IRAT) CELL RESELECTION

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 190 days.

(21) Appl. No.: 14/448,774

(22) Filed: Jul. 31, 2014

(65) Prior Publication Data

US 2016/0037388 A1    Feb. 4, 2016

(51) Int. Cl.
| | |
|---|---|
| H04W 4/00 | (2009.01) |
| H04W 36/00 | (2009.01) |
| H04W 24/10 | (2009.01) |
| H04W 76/06 | (2009.01) |
| H04W 36/34 | (2009.01) |
| H04W 36/30 | (2009.01) |
| H04W 88/06 | (2009.01) |
| H04W 36/36 | (2009.01) |

(52) U.S. Cl.
CPC .......... *H04W 36/0011* (2013.01); *H04W 24/10* (2013.01); *H04W 36/34* (2013.01); *H04W 76/068* (2013.01); *H04W 36/0083* (2013.01); *H04W 36/30* (2013.01); *H04W 36/36* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,249,017 B2 | 8/2012 | Chen et al. | |
| 2009/0059871 A1 | 3/2009 | Nader et al. | |
| 2009/0323638 A1 | 12/2009 | Catovic et al. | |
| 2010/0113010 A1 | 5/2010 | Tenny et al. | |
| 2010/0208707 A1* | 8/2010 | Hamabe | H04W 24/10 370/332 |
| 2011/0176511 A1* | 7/2011 | Sayeedi | H04W 36/0016 370/331 |
| 2012/0302241 A1* | 11/2012 | Klingenbrunn | H04W 48/16 455/436 |
| 2013/0052965 A1 | 2/2013 | Meylan et al. | |
| 2013/0189987 A1 | 7/2013 | Klingenbrunn et al. | |
| 2013/0258883 A1 | 10/2013 | Vargas et al. | |
| 2014/0038609 A1 | 2/2014 | Henttonen et al. | |
| 2014/0066067 A1 | 3/2014 | Karri | |

OTHER PUBLICATIONS

International Search Report and Written Opinion—PCT/US2015/039238—ISA/EPO—Oct. 1, 2015.

* cited by examiner

*Primary Examiner* — Kevin C Harper
(74) *Attorney, Agent, or Firm* — Seyfarth Shaw LLP

(57) ABSTRACT

A cell reselection technique establishes a data call on a different radio access technology (RAT) when a background application requests initiation of a data call while camped on a serving RAT. Rather than setting up the data call immediately on the serving RAT, a user equipment (UE) determines signal quality of the other RAT. When the signal quality is good, the UE delays call setup until after reselecting to the other RAT.

20 Claims, 9 Drawing Sheets

ENHANCED INTER-RADIO ACCESS TECHNOLOGY (IRAT) CELL RESELECTION

BACKGROUND

1. Field

The present disclosure relates generally to wireless communication systems, and more particularly, cell reselection in a wireless network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA), which extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes receiving a request to initiate a data call from a background data application while in idle mode in a first radio access technology (RAT). The method also includes checking a signal quality of a cell of a second RAT in response to receiving the request to initiate the data call. The method also includes delaying call set up procedures in the first RAT when the signal quality is above a cell reselection threshold and a cell reselection timer is running and not expired.

According to another aspect of the present disclosure, an apparatus for wireless communication includes means for receiving a request to initiate a data call from a background data application while in idle mode in a first radio access technology (RAT). The apparatus may also include means for checking a signal quality of a cell of a second RAT in response to receiving the request to initiate the data call. The apparatus may also include means for delaying call set up procedures in the first RAT when the signal quality is above a cell reselection threshold and a cell reselection timer is running and not expired.

Another aspect discloses a computer program product for wireless communications in a wireless network having a non-transitory computer-readable medium. The computer readable medium has non-transitory program code recorded thereon which, when executed by the processor(s), causes the processor(s) to perform the operation of receiving a request to initiate a data call from a background data application while in idle mode in a first radio access technology (RAT). The program code also causes the processor(s) to check a signal quality of a cell of a second RAT in response to receiving the request to initiate the data call. The program code also causes the processor(s) to delay call set up procedures in the first RAT when the signal quality is above a cell reselection threshold and a cell reselection timer is running and not expired.

Another aspect discloses an apparatus for wireless communication and includes a memory and at least one processor coupled to the memory. The processor(s) is configured to receive a request to initiate a data call from a background data application while in idle mode in a first radio access technology (RAT). The processor(s) is also configured to check a signal quality of a cell of a second RAT in response to receiving the request to initiate the data call. The processor(s) is also configured to delay call set up procedures in the first RAT when the signal quality is above a cell reselection threshold and a cell reselection timer is running and not expired.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
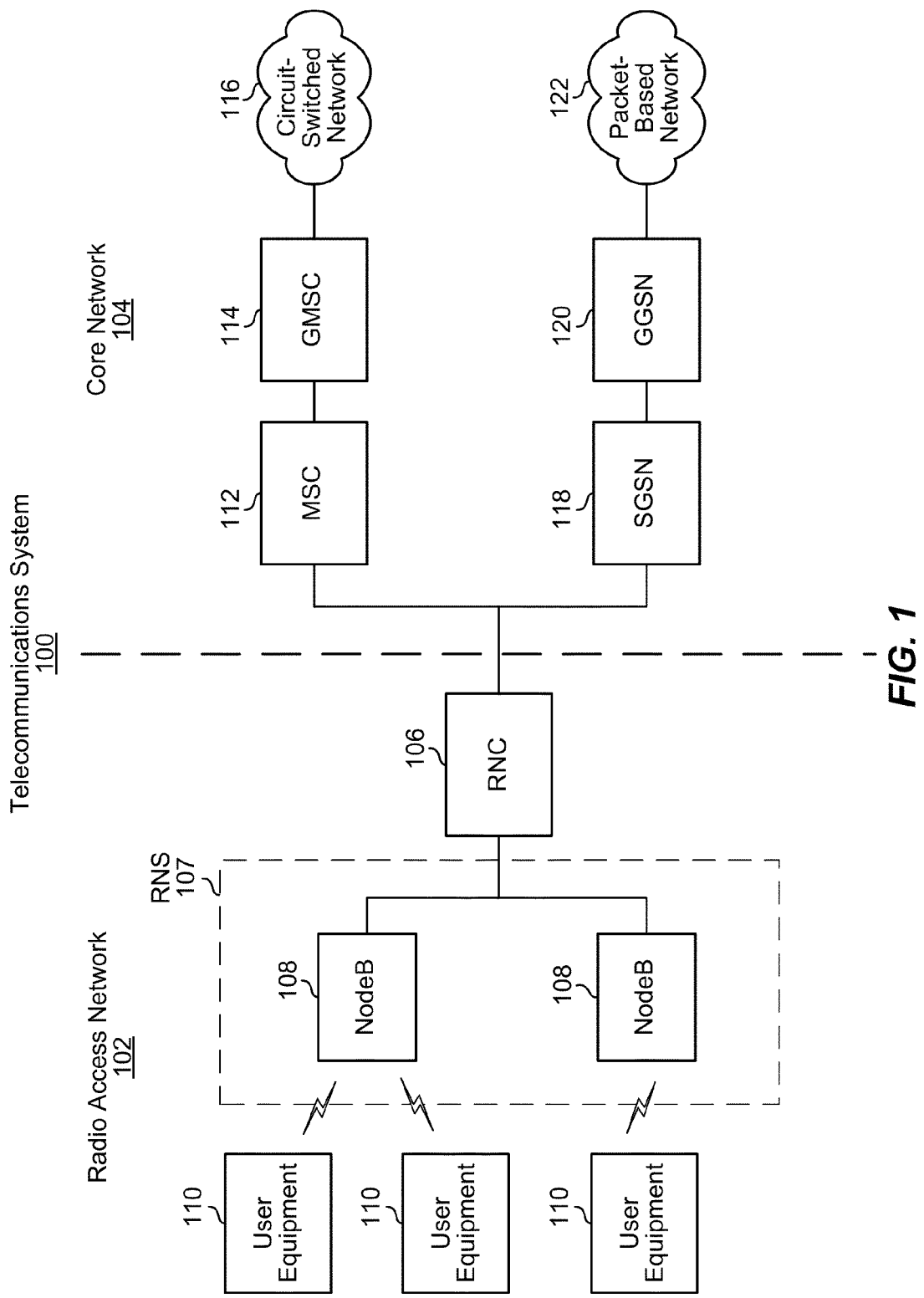
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of radio network subsystems (RNSs) such as an RNS 107, each controlled by a radio network controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called "chips." The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
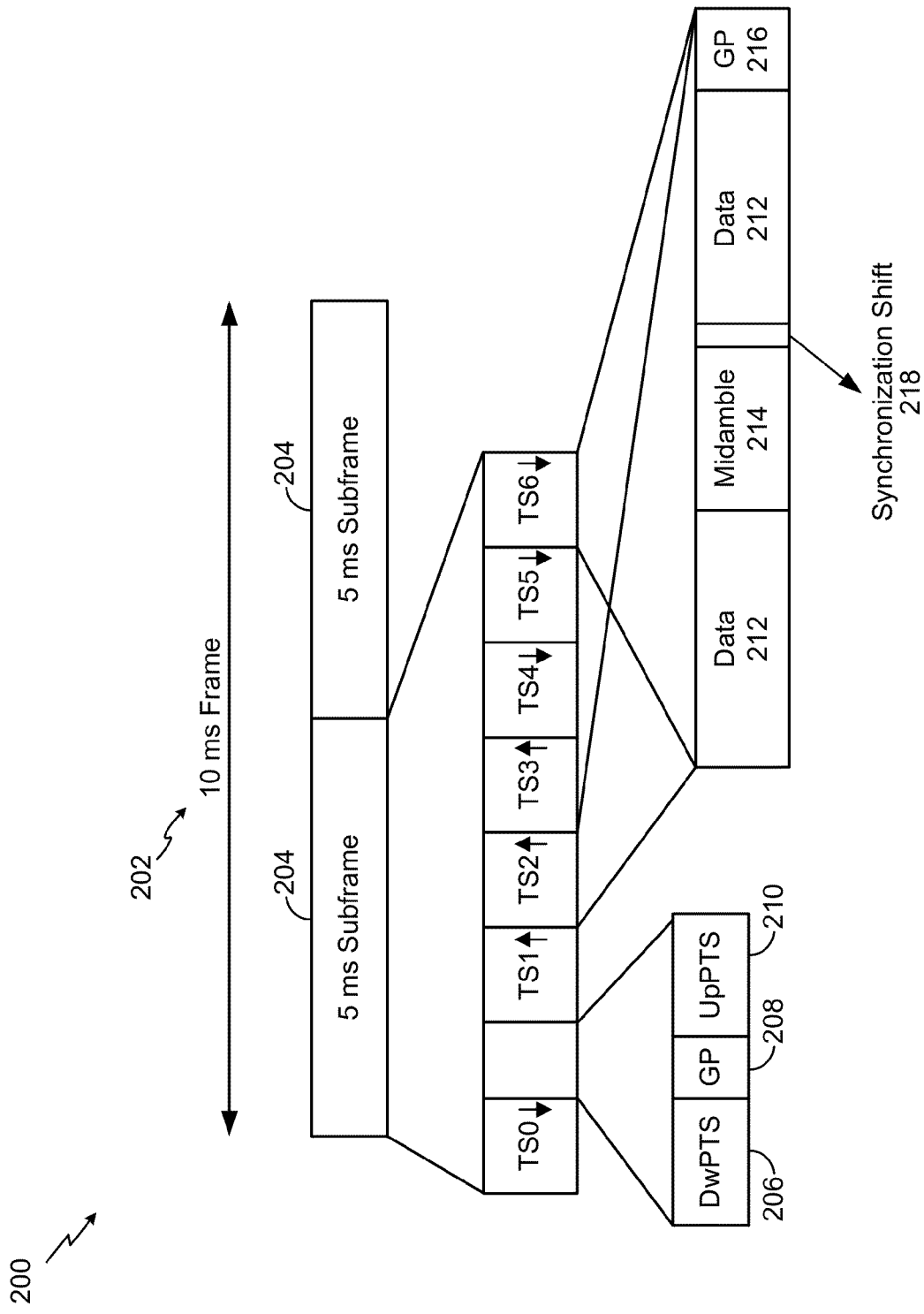
FIG. 2 is a block diagram conceptually illustrating an example of a frame structure in a telecommunications system.

FIG. 2 shows a frame structure 200 for a TD-SCDMA carrier. TD-SCDMA is based on time division and code division to allow multiple UEs to share the same radio bandwidth on a particular frequency channel. The bandwidth of each frequency channel in a TD-SCDMA system ordinarily is 1.6

MHz. The TD-SCDMA carrier ordinarily operates at 1.28 Mega-chips-per-second (Mcps). A TD-SCDMA frame 202 that is 10 ms in length is illustrated. The frame 202 has two 5 ms subframes 204, and each of the subframes 204 includes seven time slots, TS0 through TS6.

The downlink and uplink transmissions share the same bandwidth in different time slots. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206 and an uplink pilot time slot (UpPTS) 210 (also known as the uplink pilot channel (UpPCH)) are located between TS0 and TS1 separated by a gap known as a guard period (GP) 208. The particular allocation of timeslots TS2 through TS6 to uplink or downlink illustrated in FIG. 2 is an example, and different frames 202 and subframes 204 may have different uplink/downlink allocations.

In each time slot, there are multiple code channels. Each time slot, TS0-TS6, may allow data transmission multiplexed on a maximum of sixteen code channels. Data transmission on a code channel includes two data portions 212 (each with a length of three-hundred-fifty-two chips) separated by a midamble 214 (with a length of one-hundred-forty-four chips) and followed by a guard period (GP) 216 (with a length of sixteen chips). The midamble 214 may be used for features, such as channel estimation, while the guard period 216 may be used to avoid inter-burst interference. Also transmitted in the data portion is some Layer 1 control information, including synchronization shift (SS) bits 218. Synchronization shift bits 218 only appear in the second part of the data portion. The synchronization shift bits 218 immediately following the midamble 214 can indicate three cases: decrease shift, increase shift, or do nothing in the upload transmit timing. The positions of the synchronization shift bits 218 are not generally used during uplink communications.

Figure 3:
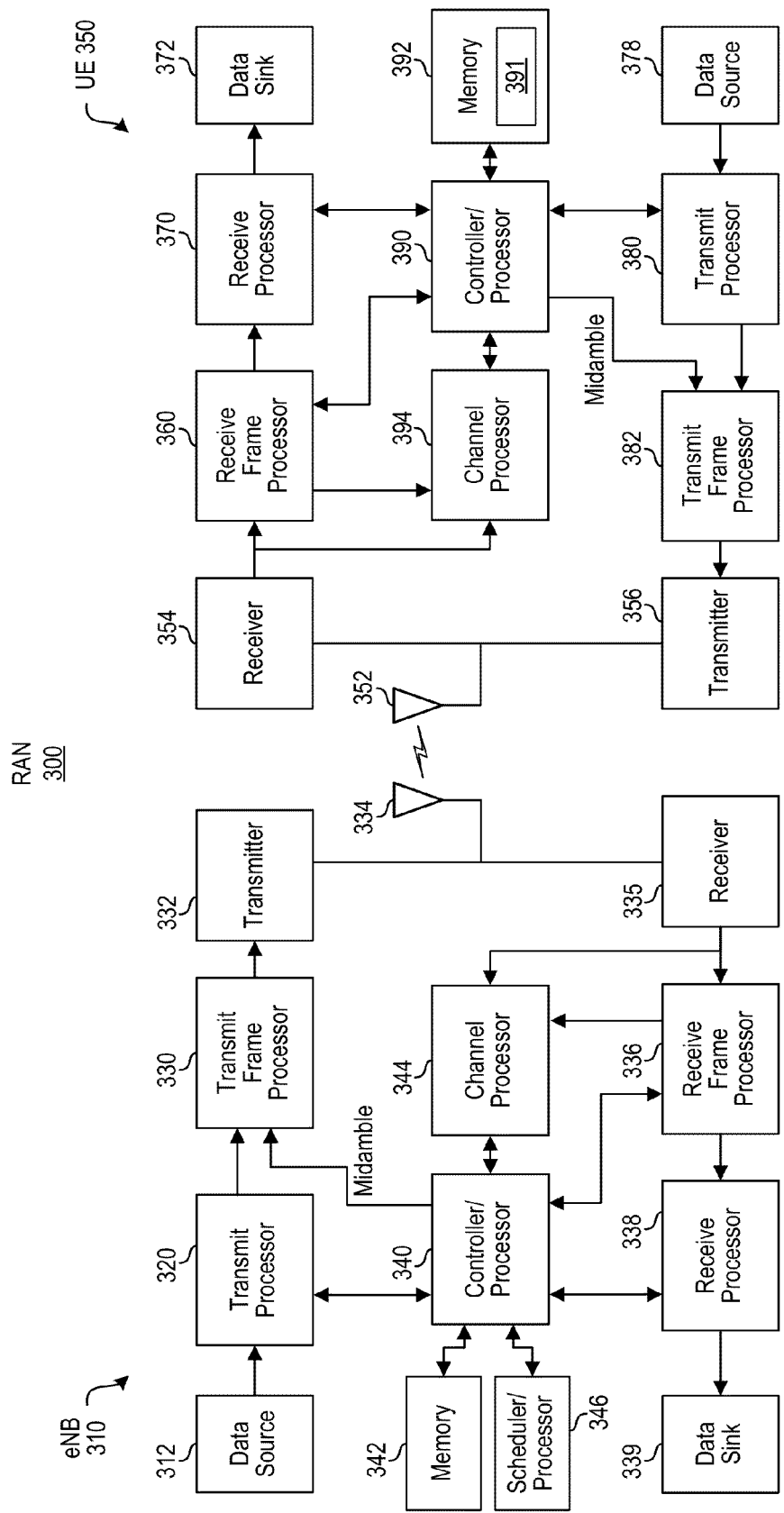
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure such as frame structure 200. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble 214 transmitted by the node B 310, may be used to select the appropriate coding, modulation, spreading, and/or scrambling schemes. The symbols produced by the transmit processor 380 will be provided to a transmit frame processor 382 to create a frame structure such as frame structure 200. The transmit frame processor 382 creates this frame structure by multiplexing the symbols with a midamble 214 from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer-readable media of memories 342 and may store data and software for the node B 310 and the UE 350, respectively. For example, a non-transitory portion of the memory 392 of the UE 350 may store computer-executable instructions 391 which, when executed by the controller/processor 390, configures the UE 350 to perform cell reselection (e.g., cell reselection module 702 in FIG. 7), search and evaluation (e.g., search and evaluation module 704), and cell signal quality comparisons with various threshold (e.g., cell signal comparison module 706). A scheduler/processor 346 at the node B 310 may allocate resources to the UEs and schedule downlink and/or uplink transmissions for the UEs.

Figure 4:
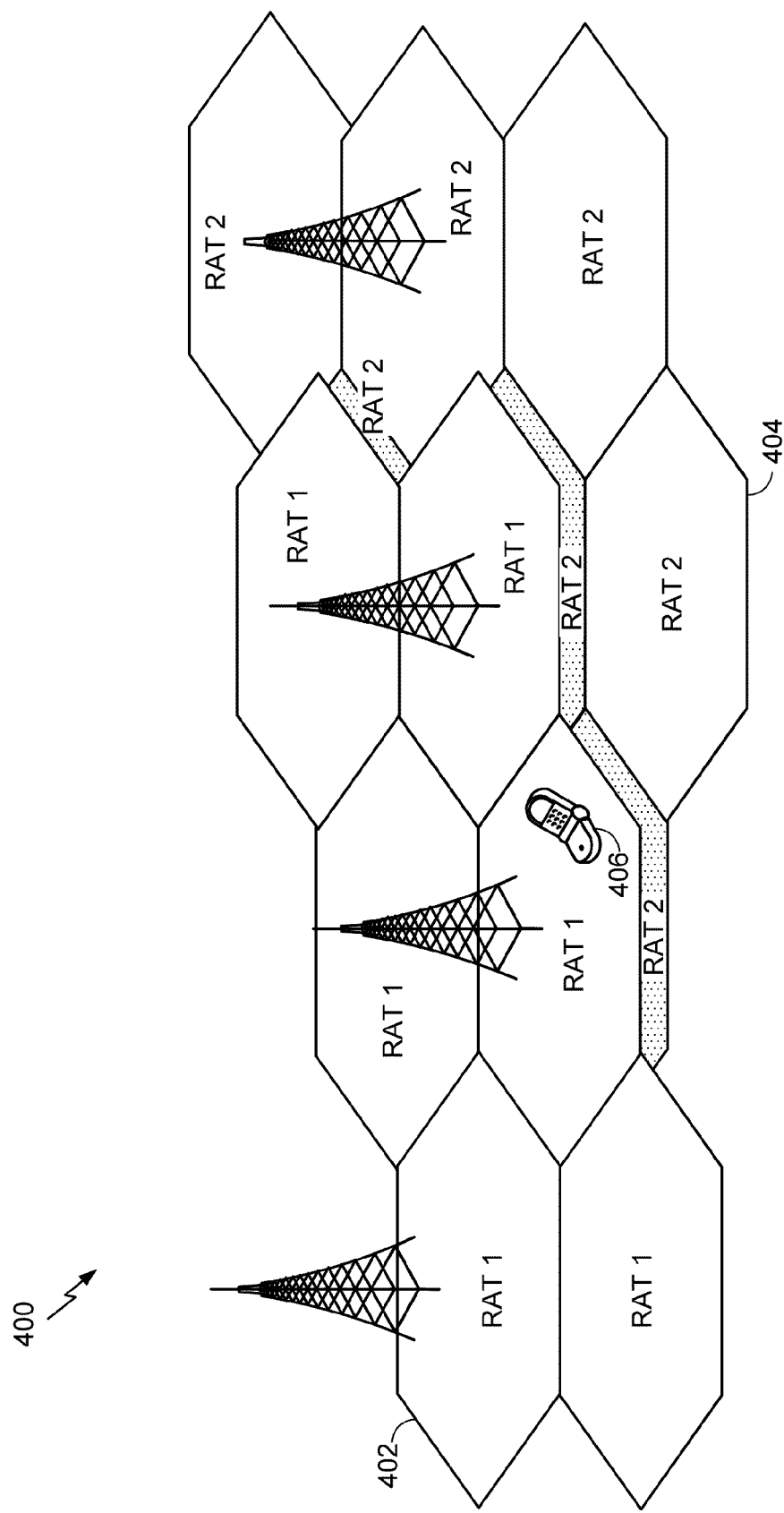
FIG. 4 illustrates overlapping network coverage areas between two different radio access technologies.

Some networks, such as a newer or newly deployed network, may cover only a portion of a geographical area. Another network, such as an older more established network, may better cover the area, including remaining portions of the geographical area. FIG. 4 illustrates coverage of an established network utilizing a first type of radio access technology (RAT-1), such as a TD-SCDMA network, and also illustrates a newly deployed network utilizing a second type of radio access technology (RAT-2), such as a Long Term Evolution (LTE) network.

The geographical area 400 may include RAT-1 cells 402 and RAT-2 cells 404. This arrangement of overlapping cells of different RATs may apply to various combinations of RATs, and in some cases, the cells of more than two RATs may be overlaid in a same geographic area (e.g., overlapping GSM, TD-SCDMA, and LTE cells in a same geographic location). A user equipment (UE) 406 may move from one cell, such as a RAT-1 cell 402, to another cell, such as a RAT-2 cell 404. The movement of the UE 406 may specify a handover or a cell reselection.

The handover or cell reselection may be performed when the UE 406 moves from a coverage area of a first RAT to the coverage area of a second RAT, or vice versa. A handover or cell reselection may also be performed, among other reasons, when there is a coverage hole or lack of coverage in one network or when there is traffic balancing between a first RAT and the second RAT networks. As part of that handover or cell reselection process, while in a connected mode with a first system (e.g., TD-SCDMA) a UE 406 may be specified to perform a measurement of a neighboring cell (such as an LTE cell). For example, the UE 406 may measure the neighbor cells of a second network for signal strength, frequency channel, and base station identity code (BSIC). The UE 406 may then connect to the strongest cell of the second network. Such measurement may be referred to as inter radio access technology (IRAT) measurement.

The UE 406 may send a serving cell a measurement report indicating results of the IRAT measurement performed by the UE. The serving cell may then trigger a handover of the UE 406 to a new cell in the other RAT based on the measurement report. The measurement may include a serving cell signal strength, such as a received signal code power (RSCP) for a pilot channel (e.g., primary common control physical channel (PCCPCH)). The signal strength is compared to a serving system threshold. The serving system threshold can be indicated to the UE 406 through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

While a UE is camped on the first RAT, such as TD-SCDMA, and is in idle mode, cell paging channel listening (CELL_PCH) mode, and/or UTRAN registration area listening (URA_PCH) mode, the UE will select and monitor the paging indicator channel (PICH) and paging channel (PCH) of the serving cell. The UE also monitors various system information, performs measurements for serving and neighboring cells, executes cell reselection evaluation processing, and reselects to a neighbor cell if that cell meets reselection trigger conditions.

For inter-RAT (IRAT) cell reselection, a serving cell on a serving RAT provides a list of neighboring cells to measure as candidates for IRAT cell reselection. In a mixed 3G/4G deployment area where the UE is camped on a 3G cell (e.g., TD-SCDMA), a broadcast message from the 3G network informs the UE of 4G (e.g., LTE) neighbor frequencies with or without cell IDs. Measurements will occur when IRAT LTE neighbor measurement conditions are satisfied. Based on measurements of these 4G frequencies, the serving cell may instruct the UE to reselect to a cell on the second RAT.

IRAT LTE neighbor measurement conditions may be satisfied in a variety of circumstances. For example, if the LTE neighbor frequencies are configured as a higher priority than the 3G serving cell, the UE will perform IRAT LTE neighbor measurements. If the LTE neighbor frequencies are configured as a lower priority than the 3G serving cell and the signal quality of the 3G serving cell is below a threshold indicated by the 3G network, the UE will perform IRAT LTE neighbor measurements.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc. That is, signal "quality" is considered to include the concept of signal "strength."

During IRAT measurements, if IRAT cell reselection conditions are satisfied until a cell reselection (i.e., time-to-trigger (TTT)) timer expires, then the UE starts cell reselection to the target LTE cell detected during IRAT measurement. That is, the UE initiates acquisition on the LTE frequency and attempts to camp on the target LTE cell after collection of system information from the LTE cell's broadcast system information block (SIB) and/or master information block (MIB).

The IRAT cell reselection conditions are satisfied when: (1) the LTE neighbor frequencies are configured with a higher priority than the 3G serving cell, and the LTE detected cell signal quality is above a threshold defined by the serving 3G network, or (2) the LTE neighbor frequencies are configured with a lower priority than the 3G serving cell, and the 3G serving cell signal quality is below a threshold while the LTE detected neighbor cell signal quality is above a threshold.

It has been observed that when a UE transitions from idle mode to connected mode frequently for short duration calls, cell reselection may be interrupted. Thus, the UE may not reselect to a better network, even though suitable cells of the better network are available.

Frequent transitions from idle to connected mode may be triggered by short background packet-switched calls. That is, data calls may be frequently triggered by background software applications on the UE. For example, a UE may be in idle discontinuous reception (DRX) mode for an average duration of two to four seconds, and then transition to a dedicated channel (DCH) for background packet-switched calls for an average of eight to ten seconds. After background data call setup the UE then transitions back to idle mode, and the transition pattern repeats, with the UE transitioning from DRX idle mode to cell DCH setup.

Because of the time spent for the background data calls, the UE may not have enough time to complete cell reselection procedures while in idle mode. That is, even if there is good LTE coverage, there is a chance that the UE will not complete 3G to LTE IRAT cell reselection when a background data call was triggered. Reselection becomes even less likely if there are multiple LTE frequencies to measure, as indicated by the 3G network, or the duration of the time-to-trigger (TTT) timer is long.

As a solution to address these deficiencies when a 3G data call (e.g., on a TD-SCDMA network) is triggered by a background data application on the UE, the UE may delay background data call setup procedures. Delaying may occur when a good LTE cell is detected on an LTE neighbor frequency even though the time-to-trigger (TTT) timer has not expired. When a new LTE measurement result is not available due to a measurement schedule defined by the protocol standard specification, no cell evaluation is performed. Rather than waiting for the time-to-trigger timer to expire or for new LTE measurement results to be available, the UE may immediately perform cell reselection to LTE. The UE subsequently initiates the background data call in LTE after completing cell reselection procedures. If, however, the LTE cell is weak, and the TTT timer resets, a 3G data call is set up while in the 3G network. If the LTE cell is weak but the TTT timer expires, the UE reselects to LTE before setting up the data call.

This solution allows the UE to camp on the LTE network instead of remaining in 3G due to frequent background data calls. That is, the frequent background data calls do not prevent the UE from having enough time to complete LTE measurements and IRAT cell reselection procedures.

Figure 5A:
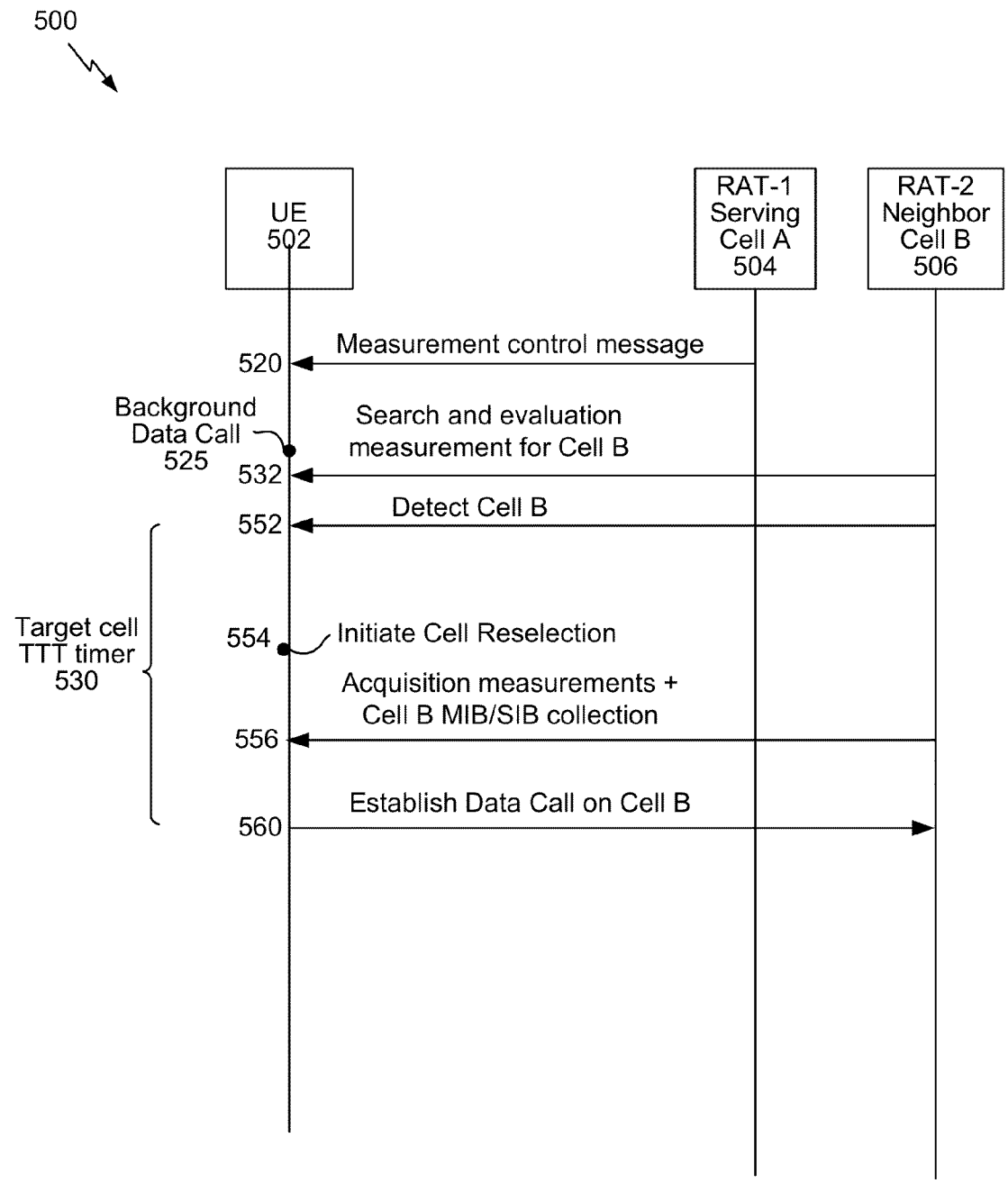
FIGS. 5A-C illustrate a call flow diagrams for performing cell reselection, according to aspects of the present disclosure.
Figure 5B:
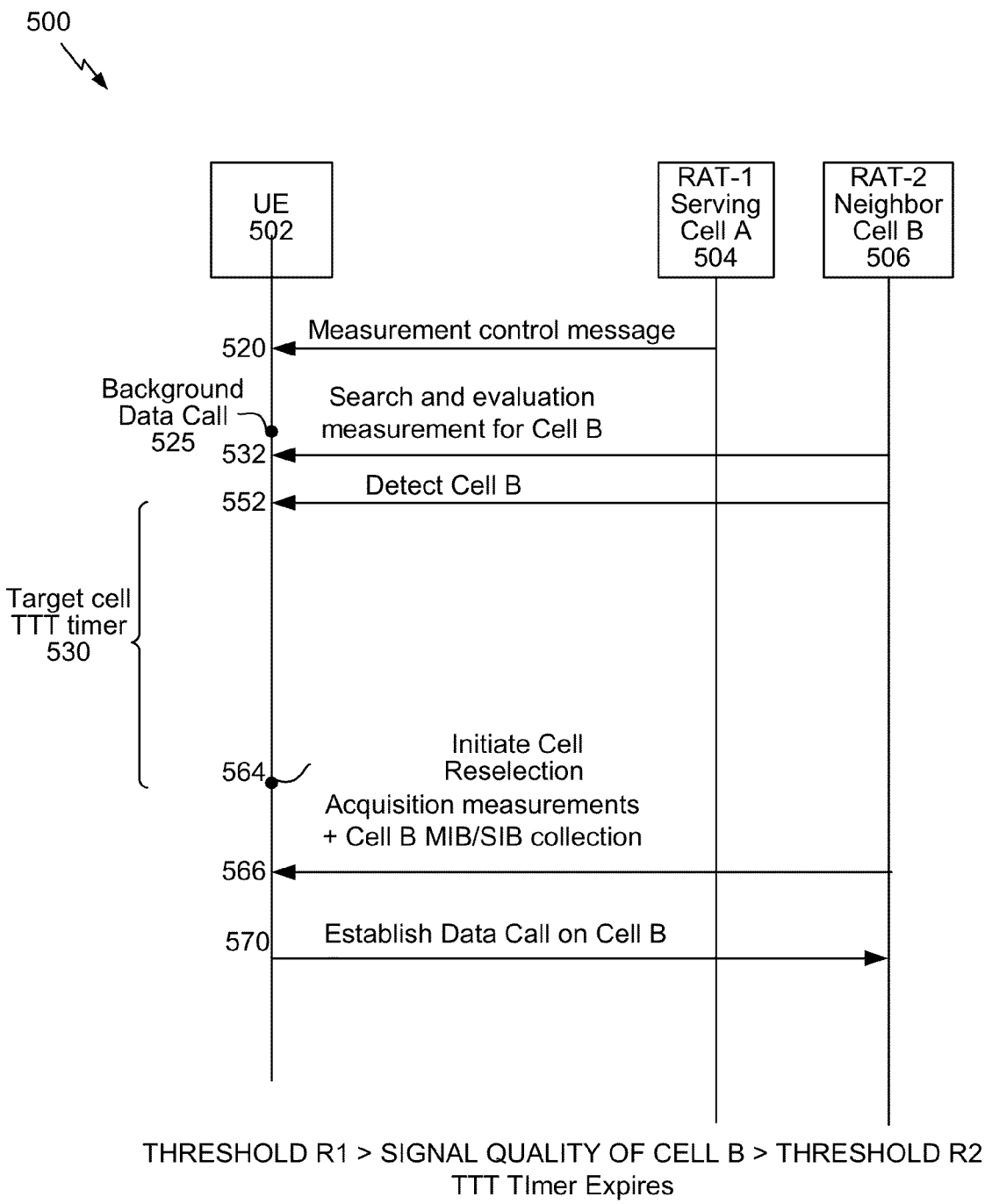
Figure 5C:
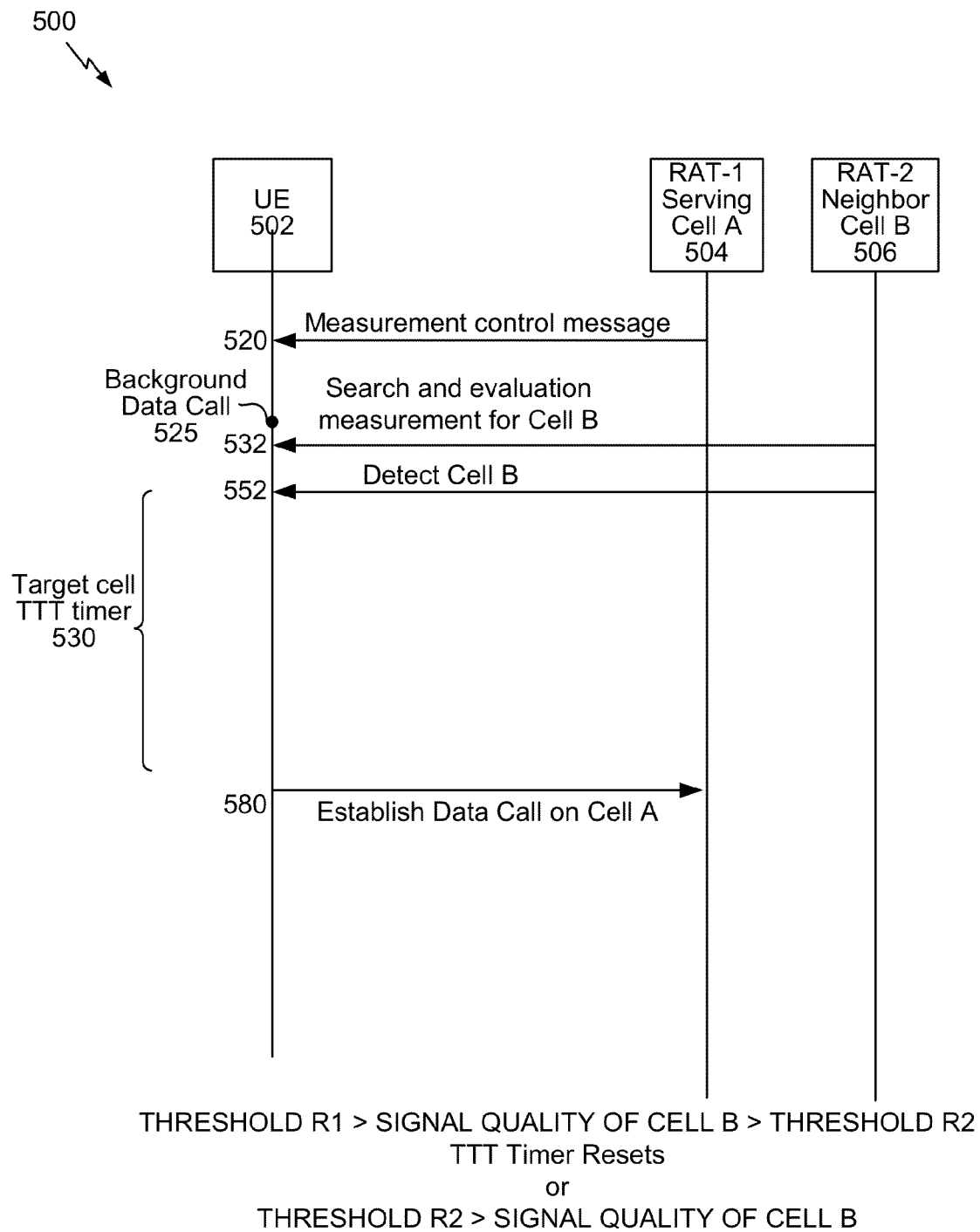

FIGS. 5A-C illustrate call flow diagrams 500 of various operations. While in idle mode, at time 520, the UE 502 receives a measurement and control message from a serving cell on the first RAT (RAT-1) 504. The message includes a list identifying cells of another RAT or RATs (e.g., RAT-2 506), including frequencies of neighboring cells, and/or other cell identifiers.

At time 525, a software application on the UE 502 requests initiation of a data call. The UE 502 starts search-and-evaluation measurement procedures at time 532 of the listed frequencies, RATs, and/or cells. Upon detecting Cell B at time 552, a target cell time-to-trigger (TTT) timer 530 starts.

As seen in FIG. 5A, if the signal quality of the cell on the second network (e.g., Cell B of RAT-2 506) is above a first threshold $R_1$, the UE 502 may initiate immediate cell reselection to the second RAT 506 at time 554, including acquisition of measurements and system information collection from Cell B at time 556. Cell reselection may begin even if the target cell time-to-trigger (TTT) timer 530 has not expired. Data call setup procedures for the background data call are delayed until cell reselection completes. At time 560 a data call is established on Cell B.

If the signal quality of Cell B is above a second threshold $R_2$ but below the first threshold $R_1$, the data call setup may or may not be delayed. If the time-to-trigger (TTT) timer 530 expires, the UE 502 delays data call setup procedures until after cell reselection, which occurs at times 564 and 566, as seen in FIG. 5B. The data call is then established at time 570 on Cell B, after cell reselection.

Otherwise, as seen in FIG. 5C, if the signal quality of Cell B is above the second threshold $R_2$ but below the first threshold $R_1$ and the target cell time-to-trigger (TTT) timer 530 resets, at time 580, the UE 502 initiates setup of the data call on the cell of the first RAT network 504. Similarly, if the signal quality of Cell B is below the second threshold $R_2$, at time 580, the UE 502 initiates setup of the data call on the cell of the first RAT network 504 at time 580.

Figure 6:
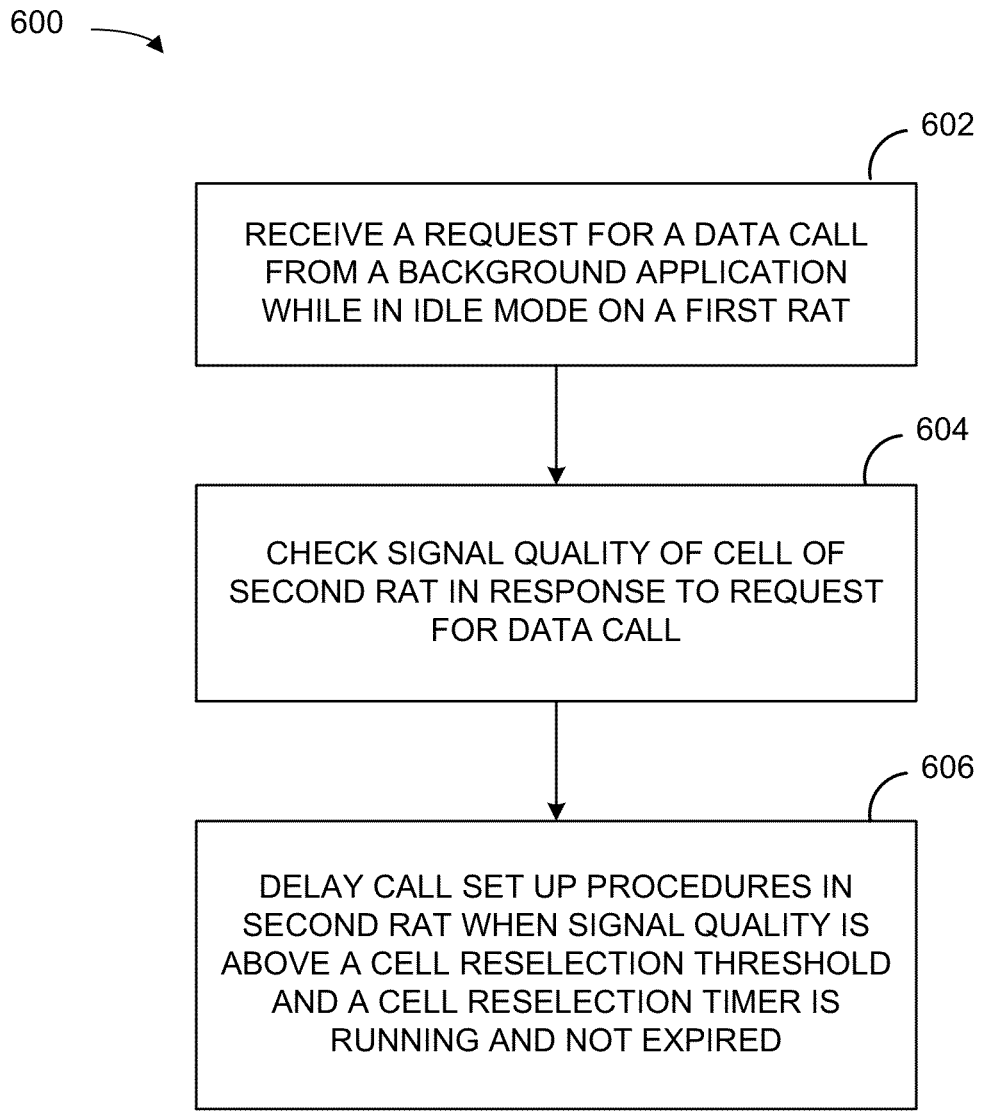
FIG. 6 is a block diagram illustrating a method for performing cell reselection, according to an aspect of the present disclosure.

FIG. 6 shows a wireless communication method 600 based on the comparisons and determinations discussed with respect to FIG. 5. A UE receives a request for a data call from a background application while in idle mode on a first RAT, as shown in block 602. The UE also checks signal quality of a detected cell of a second RAT in response to the request for the data call, as shown in block 604. Finally, the UE delays call setup procedures in the second RAT when the signal quality is above a cell reselection threshold and a cell reselection timer is running and not expired, as shown in block 606.

Figure 7:
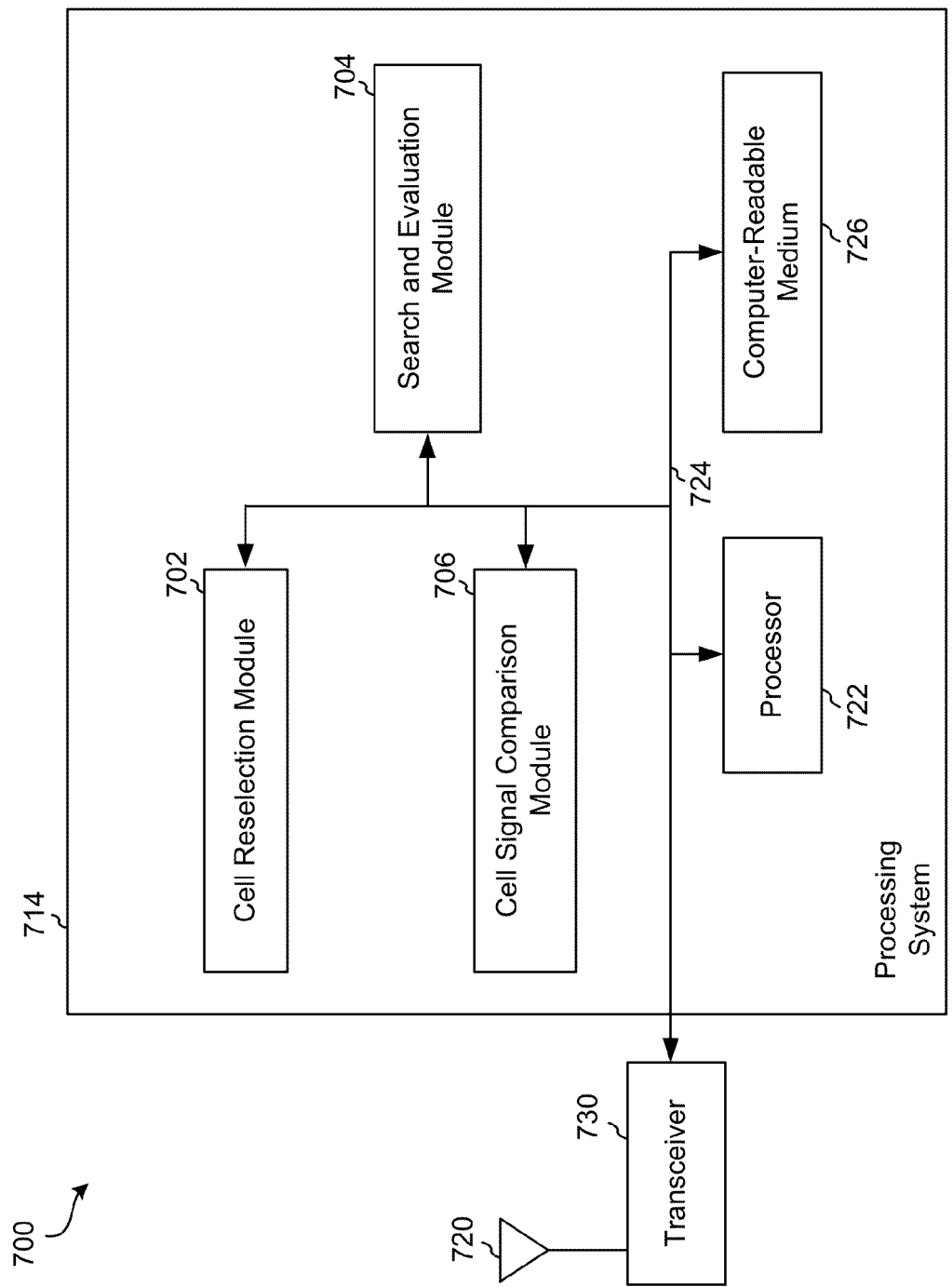
FIG. 7 is a diagram illustrating an example of a hardware implementation for a mobile device employing a processing system to perform cell reselection.

FIG. 7 is a diagram illustrating an example of a hardware implementation of an apparatus 700 employing a processing system 714. The processing system 714 includes modules 702-706. The modules 702-706 may be executed as software, firmware, hardware, or a combination thereof, and may each include one or more of the components illustrated with UE 350 in FIG. 3, additional components not illustrated in FIG. 3, or some combination thereof.

The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, such as the controller/processors 390, a non-transitory computer-readable medium 726 (e.g., a portion of memory 392 holding executable code 391), a cell reselection module 702, a search and evaluation module 704, and a cell signal comparison module 706.

For example, the cell reselection module 702 may be implemented by software stored in memory 392 (as executable instructions 391) by the controller/processor 390. The cell reselection module 702 manages the process (as discussed in FIGS. 5A-C) in coordination with the other components of the UE 350. As another example, the search and evaluation module 704 may be implemented by a combination of the receiver 354, the receive frame processor 360, the receive processor 370, the channel processor 394, and executable instructions (e.g., 391) on the controller/processor. The instructions 391 can be executed by the controller/processor 390 controlling the receiver 354 to perform search and evaluation procedures based on channel estimates from the channel processor 394 and/or based on decoded information from the receive processor 370. As another example the cell signal comparison module 706 may be implemented as instructions (e.g., 391) executed by the controller/processor 390 to compare signal quality information output for different cells, as output by the receiver 354 with the thresholds ($R_1$, $R_2$).

The bus 724 may also link various other circuits such as timing sources, peripherals, voltage regulators, and power management circuits, which are well known in the art, and therefore, will not be described any further.

The UE 700 is coupled to a transceiver 730 that may comprise receiver 354 and transmitter 356. The transceiver 730 is coupled to one or more antennas 720. The transceiver 730 enables communicating with various other apparatus (e.g., RNS 107, eNB 310) over a transmission medium in accordance with various protocols (e.g., RAT-1, RAT-2, etc.).

In one configuration, an apparatus such as a UE 350 may be configured to carry out the methods and processes illustrated with FIGS. 5A-7, the apparatus including means for receiving a request to initiate a data call from a background data application while in idle mode in a first radio access technology (RAT). The means for receiving may include the antennas 352, 720, the receiver 354, the transceiver 730, the channel processor 394, the receive frame processor 360, the receive processor 370, the controller/processor 390, 722, the memory 392, executable instructions (e.g., 391) on the controller/processor, the cell reselection module 702 and/or the processing system 714 configured to perform the receiving means.

The UE 350 may also be configured to include means for checking a signal quality of a cell of a second RAT in response to receiving the request to initiate the data call. The means for checking may include the antennas 352, 720, the receiver 354, the channel processor 394, the receive frame processor 360, the receive processor 370, the transmitter 356, the transmit frame processor 382, the transmit processor 380, the controller/processor 390, the memory 392, executable instructions (e.g., 391) on the controller/processor, search and evaluation module 704 and/or the processing system 714 configured to perform the checking means.

The UE 350 may also be configured to include means for delaying call set up procedures in the first RAT when the signal quality is above a cell reselection threshold and a cell reselection timer is running and not expired. The means for delaying may include the antennas 352, 720, the receiver 354, the channel processor 394, the receive frame processor 360, the receive processor 370, the transmitter 356, the transmit frame processor 382, the transmit processor 380, the controller/processor 390, the memory 392, executable instructions (e.g., 391) on the controller/processor, cell signal comparison module 706, and/or the processing system 714 configured to perform the delaying means.

Several aspects of a telecommunications system has been presented with reference to TD-SCDMA and LTE. However, as those skilled in the art will readily appreciate, various aspects described throughout this disclosure may be extended to other inter-RAT measurements and handovers, including IRAT operations in other wireless telecommunication systems, network architectures, and communication standards. Although discussed in the context of the first RAT (RAT-1) being a third-generation protocol and the second RAT (RAT-2) being a fourth-generation protocol, the RATs can be any protocol and any generation of technology (including a same generation), so long as the first RAT and the second RAT (and third RAT, etc.) are different protocols. By way of example, various aspects may be extended to other UMTS systems such as W-CDMA, high speed downlink packet access (HSDPA), high speed uplink packet access (HSUPA), high speed packet access plus (HSPA+) and TD-CDMA, and GSM. Aspects may also be extended to various systems employing long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory 392 is shown separate from the various processors, the memory or portions of the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a request to initiate a data call from a background data application while in idle mode in a first radio access technology (RAT);
   checking a signal quality of a cell of a second RAT in response to receiving the request to initiate the data call; and
   delaying call set up procedures in the first RAT when the signal quality is above a cell reselection threshold and a cell reselection timer is running and not expired.

2. The method of claim 1, further comprising immediately performing cell reselection to the second RAT and setting up the data call on the second RAT when the signal quality is above a predefined threshold.

3. The method of claim 1, further comprising performing cell reselection to the second RAT and setting up the data call on the second RAT when the cell reselection timer expires and the signal quality is below a predefined threshold.

4. The method of claim 1, further comprising not performing cell reselection to the second RAT; and
   setting up the data call with the first RAT when the cell reselection timer resets or the signal quality is below a predefined threshold.

5. The method of claim 1, further comprising delaying call setup procedures when a new measurement of the second RAT is not available due to scheduling.

6. An apparatus for wireless communication, comprising:
   means for receiving a request to initiate a data call from a background data application while in idle mode in a first radio access technology (RAT);
   means for checking a signal quality of a cell of a second RAT in response to receiving the request to initiate the data call; and
   means for delaying call set up procedures in the first RAT when the signal quality is above a cell reselection threshold and a cell reselection timer is running and not expired.

7. The apparatus of claim 6, further comprising means for immediately performing cell reselection to the second RAT and setting up the data call on the second RAT when the signal quality is above a predefined threshold.

8. The apparatus of claim 6, further comprising means for performing cell reselection to the second RAT and means for setting up the data call on the second RAT when the cell reselection timer expires and the signal quality is below a predefined threshold.

9. The apparatus of claim 6, further comprising means for not performing cell reselection to the second RAT; and
   means for setting up the data call with the first RAT when the cell reselection timer resets or the signal quality is below a predefined threshold.

10. The apparatus of claim 6, further comprising means for delaying call setup procedures when a new measurement of the second RAT is not available due to scheduling.

11. An apparatus for wireless communication, comprising:
    a memory; and
    at least one processor coupled to the memory and configured:
    to receive a request to initiate a data call from a background data application while in idle mode in a first radio access technology (RAT);
    to check a signal quality of a cell of a second RAT in response to receiving the request to initiate the data call; and
    to delay call set up procedures in the first RAT when the signal quality is above a cell reselection threshold and a cell reselection timer is running and not expired.

12. The apparatus of claim 11, in which the at least one processor is further configured to immediately perform cell reselection to the second RAT and setting up the data call on the second RAT when the signal quality is above a predefined threshold.

13. The apparatus of claim 11, in which the at least one processor is further configured to perform cell reselection to the second RAT and setting up the data call on the second RAT when the cell reselection timer expires and the signal quality is below a predefined threshold.

14. The apparatus of claim 11, in which the at least one processor is further configured to not perform cell reselection to the second RAT; and
    to set up the data call with the first RAT when the cell reselection timer resets or the signal quality is below a predefined threshold.

15. The apparatus of claim 11, in which the at least one processor is further configured to delay call setup procedures when a new measurement of the second RAT is not available due to scheduling.

16. A computer program product for wireless communication, comprising:
    a non-transitory computer-readable medium having program code recorded thereon, the program code comprising:
    program code to receive a request to initiate a data call from a background data application while in idle mode in a first radio access technology (RAT);
    program code to check a signal quality of a cell of a second RAT in response to receiving the request to initiate the data call; and
    program code to delay call set up procedures in the first RAT when the signal quality is above a cell reselection threshold and a cell reselection timer is running and not expired.

17. The computer program product of claim 16, further comprising program code to immediately perform cell reselection to the second RAT and setting up the data call on the second RAT when the signal quality is above a predefined threshold.

18. The computer program product of claim 16, further comprising program code to perform cell reselection to the second RAT and setting up the data call on the second RAT when the cell reselection timer expires and the signal quality is below a predefined threshold.

19. The computer program product of claim 16, further comprising program code to not perform cell reselection to the second RAT; and
   program code to set up the data call with the first RAT when the cell reselection timer resets or the signal quality is below a predefined threshold.

20. The computer program product of claim 16, further comprising program code to delay call setup procedures when a new measurement of the second RAT is not available due to scheduling.

* * * * *